(12) United States Patent
Vedsted et al.

(10) Patent No.: US 8,801,507 B2
(45) Date of Patent: Aug. 12, 2014

(54) SHRIMP DEHEADING APPARATUS AND METHODS

(71) Applicant: Laitram, L.L.C., Harahan, LA (US)

(72) Inventors: Lars Vedsted, Vadum (DK); Brent A. Ledet, River Ridge, LA (US)

(73) Assignee: Laitram, L.L.C., Harahan, LA (US)

(*) Notice: Subject to any disclaimer, the term of this patent is extended or adjusted under 35 U.S.C. 154(b) by 0 days.

(21) Appl. No.: 14/033,545

(22) Filed: Sep. 23, 2013

(65) Prior Publication Data

US 2014/0087641 A1    Mar. 27, 2014

Related U.S. Application Data

(60) Provisional application No. 61/706,187, filed on Sep. 27, 2012.

(51) Int. Cl.
*A22C 29/02*    (2006.01)

(52) U.S. Cl.
CPC .................................... *A22C 29/028* (2013.01)
USPC .......................................................... 452/4

(58) Field of Classification Search
USPC ................................................ 452/1, 4, 8–10
See application file for complete search history.

(56) References Cited

U.S. PATENT DOCUMENTS

| | | | |
|---|---|---|---|
| 2,888,709 A * | 6/1959 | Lapeyre | 452/4 |
| 3,209,393 A | 10/1965 | Stephenson | |
| 4,307,492 A | 12/1981 | Braginsky et al. | |
| 4,517,707 A | 5/1985 | Braginsky et al. | |
| 4,692,965 A | 9/1987 | Stephenson | |
| 5,112,269 A | 5/1992 | Petersen et al. | |
| 5,195,921 A * | 3/1993 | Ledet | 452/4 |
| 5,259,809 A * | 11/1993 | Rainey, Jr. | 452/1 |
| 6,736,716 B1 | 5/2004 | Sugiyama | |

* cited by examiner

*Primary Examiner* — Richard Price, Jr.
(74) *Attorney, Agent, or Firm* — James T. Cronvich

(57) ABSTRACT

Apparatus and methods for deheading shrimp using the Venturi Effect. A shrimp-laden fluid is pumped through a conduit system and lined with one or more venturi tubes. The acceleration of the fluid through the venturis detaches the heads from the shrimp. The cross-sectional areas of the venturis each have a major axis and a shorter minor axis. The major axis is long enough to receive the majority of or all the length of a shrimp and minimize hard collisions with the entrance to the venturi that could damage the shrimp.

15 Claims, 4 Drawing Sheets

SHRIMP DEHEADING APPARATUS AND METHODS

BACKGROUND

The invention relates generally to shellfish processing and more particularly to apparatus and methods for deheading shrimp with hydrodynamic forces.

Deheading shrimp by hydrodynamic force is known from U.S. Pat. No. 5,195,921, "Apparatus for Deheading and Cleansing Shrimp," issued Mar. 23, 1993. In that patent, a shrimp-laden fluid is pumped through conduit that abruptly narrows. The abrupt decrease in the cross-section of the conduit causes the flow to accelerate through the narrow cross section according to the Venturi Effect. Hydrodynamic forces caused by the change in cross section tend to detach heads from shrimp. The cross section of the conduit in the patent is circular along its entire length. When a pipe with a four-inch diameter is used as the main conduit, the diameter of the narrow region is even smaller. Shrimp, whose outer dimensions are greater than the diameter of the narrow region, tend to bump into the narrowing conduit. The collisions with the conduit walls can damage the shrimp, especially fragile cold-water shrimp. As shown in FIGS. 1A and 1B, cold-water shrimp 10 have a long, thin sixth segment 12 that is easy to damage. The joint 14 between the third and fourth segments is also susceptible to damage. In general, the muscle tissue in cold-water shrimp is much weaker than in the sturdier warm-water shrimp. When a cold-water shrimp 10 approaches the narrow region of the conduit side-on, as opposed to head or tail first, it bangs into the sides of the opening into the narrow region. The collisions do help remove the head, but they also can cause the shrimp to break at its weak spots.

SUMMARY

This shortcoming in detaching heads from shrimp is addressed by apparatus embodying features of the invention. One such apparatus comprises a conduit enclosing a fluid channel and flow control means inducing a flow of shrimp-laden fluid in the conduit. The conduit has an open first end and an opposite open second end downstream of the first end along the fluid channel. An input portion of the conduit extends downstream along the fluid channel from the first end and defines the fluid channel with a first cross-sectional area. A venturi extends upstream along the fluid channel from the second end and defines a length of the fluid channel with a second cross-sectional area smaller than the first cross-sectional area. The second cross-sectional area has a major axis and a shorter minor axis. A transition portion of the conduit is disposed between the input portion and the venturi. The transition portion defines a length of the fluid channel with a cross-sectional area converging from the first cross-sectional area to the second cross-sectional area. The shrimp-laden fluid flows through the first end of the conduit, the fluid channel, and the second end. The speed of the fluid along the length of the fluid channel in the converging cross-sectional area of the transition portion increases to a speed in the venturi sufficient to detach heads from shrimp.

Another version of such an apparatus comprises a conduit system defining a fluid channel and venturis disposed in the conduit system in line with the fluid channel at spaced apart positions. Flow control means induce a flow of shrimp-laden fluid in the fluid channel to convey the shrimp-laden fluid through the conduit system. The venturis cause an increase in the speed of the shrimp-laden fluid in each of the venturis sufficient to detach heads from shrimp.

According to another aspect of the invention, a method for detaching the heads of shrimp comprises: (a) flowing a shrimp-laden fluid through a fluid channel in a conduit system; and (b) restricting the fluid channel in venturis at spaced apart locations along the conduit system to increase the speed of the shrimp-laden fluid in each of the venturis sufficient to detach heads from shrimp.

BRIEF DESCRIPTION OF THE DRAWINGS

These aspects and features of the invention are described in more detail in the following description, appended claims, and accompanying drawings, in which:

DETAILED DESCRIPTION

Figure 1A:
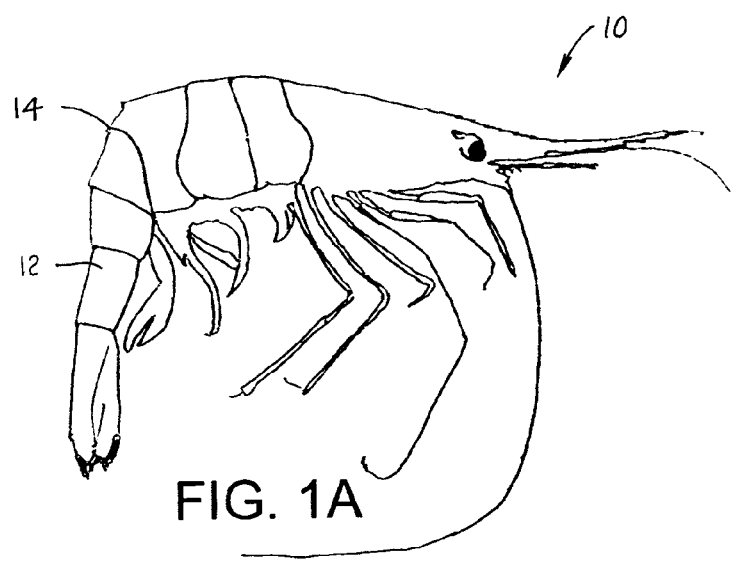
FIGS. 1A and 1B are side and top views of a cold-water shrimp.
Figure 1B:
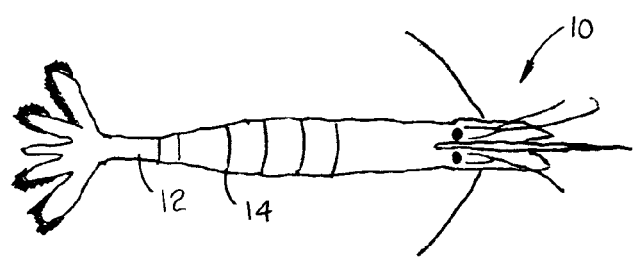
Figure 2:
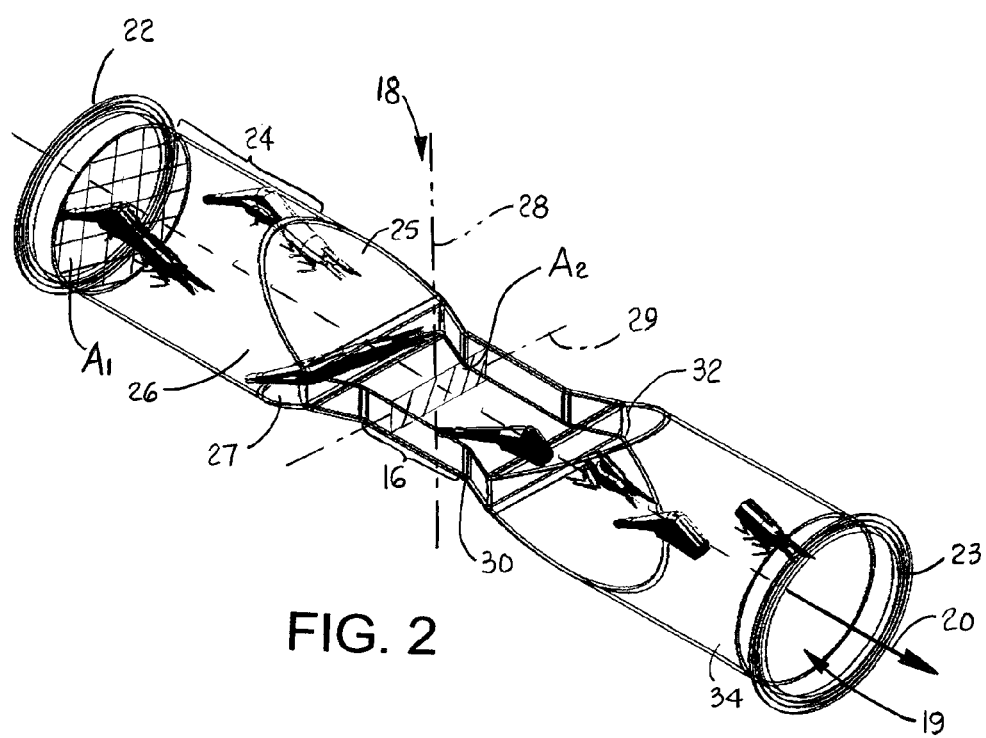
FIG. 2 is an isometric view of a venturi tube for a deheading apparatus embodying features of the invention.

A venturi tube, or venturi, usable in a deheading system embodying features of the invention is shown in FIG. 2. The venturi 16 is a restricted portion of a conduit 18 enclosing a fluid channel 19 conveying a shrimp-laden fluid along a fluid path 20. The conduit has an open entrance end 22 and an opposite open exit end 23 downstream of the entrance end. An input portion 24 of the conduit extends downstream from the entrance end 22 and defines the fluid channel with a cross-sectional area $A_1$.

A transition portion 26 of the conduit extends downstream from the input portion 24 to the venturi 16. The transition portion 26 defines a length of the fluid channel with a converging cross-sectional area formed by two pairs of converging parabolic walls: large walls 25 and small walls 27. The venturi 16 has a cross-sectional area $A_2$ that is less than that of the input portion 24. In the example of FIG. 2, the shape of the cross-sectional area $A_2$ of the venturi is rectangular, but may be other shapes, e.g., elliptical or oval, having a minor axis 28 shorter than its major axis 29. The venturi 16 extends downstream to an open end 30. In FIG. 2, the venturi's end 30 opens into a downstream transition portion 32 of the conduit defining a length of the fluid channel 19 diverging outward from the cross-sectional area $A_2$ of the venturi to a larger cross-sectional area of an output portion 34 of the conduit. In this example, the output portion 34 has the same cross-sectional area $A_1$ as the input portion 24. Thus, the conduit 18 in FIG. 2 is reversible. But the downstream transitional portion 32 may be eliminated and replaced with a flat plate having an opening forming an end wall of the output portion 34 at the open end 30 of the venturi 16.

Figure 3A:
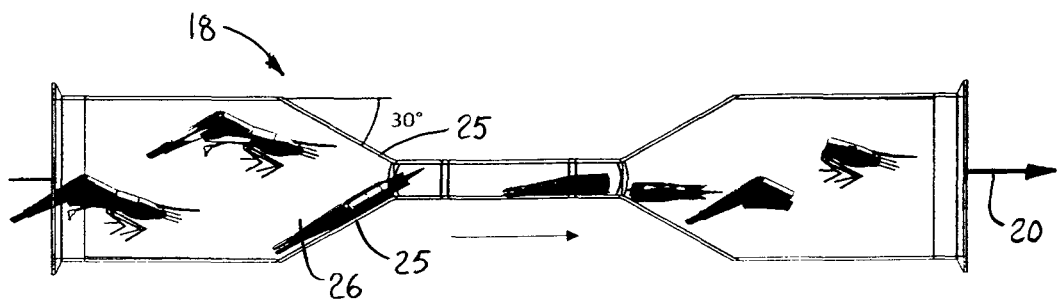
FIGS. 3A-3C are side views of a venturi tube as in FIG. 2 with a tapered transition region with taper angles of 30°, 45°, and 60°.
Figure 3B:
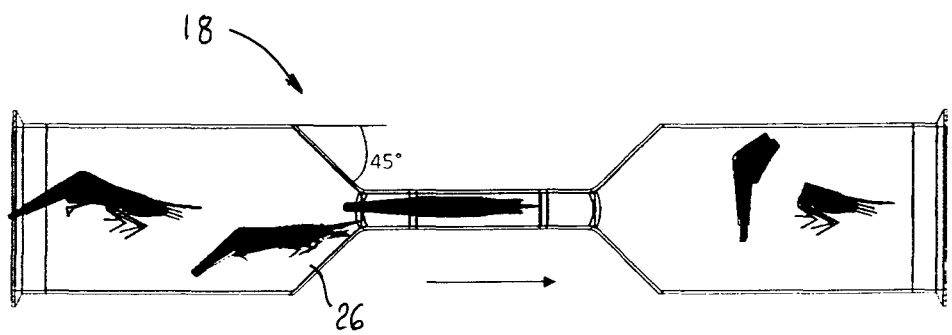
Figure 3C:
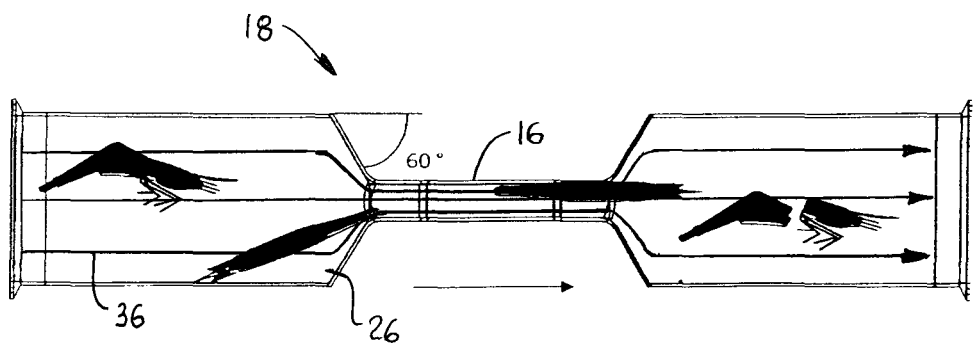

As shown in FIGS. 3A-3C, the transition portion of the conduit 18 may be gradual (FIG. 3A with a 30° taper of the long parabolic walls 25 relative to the direction of the fluid path 20 and a long length), sharp (FIG. 3C with a 60° taper of the long parabolic walls 25 and a short length), or intermediate (FIG. 3B with a 45° taper of the long parabolic walls 25 and an intermediate length). The sharp transition portion 26 of FIG. 3 causes a more abrupt acceleration of the fluid through the channel than the longer tapers of FIGS. 3A and 3B and is more useful for sturdier shrimp. As indicated by the convergence of streamlines 36 in the transition portion 26 of the conduit, the flow accelerates to a higher speed in the venturi 16. The converging flow tends to orient the shrimp along the streamlines by minimizing the surface area broadside to the flow. The hydrodynamic forces caused by the rapid acceleration of the flow at the venturi and by the non-uniformity of the flow just upstream of the venturi is sufficient to detach heads from the shrimp. The major axis 29 of the venturi cross-sectional area $A_2$ is long enough to admit a major portion of, if not all, the length of a shrimp into the venturi without severe collisions with the interior walls of the conduit that could break the shrimp between segments. For this reason, the venturi of FIG. 2 is especially useful for deheading fragile cold-water shrimp.

Figure 4A:
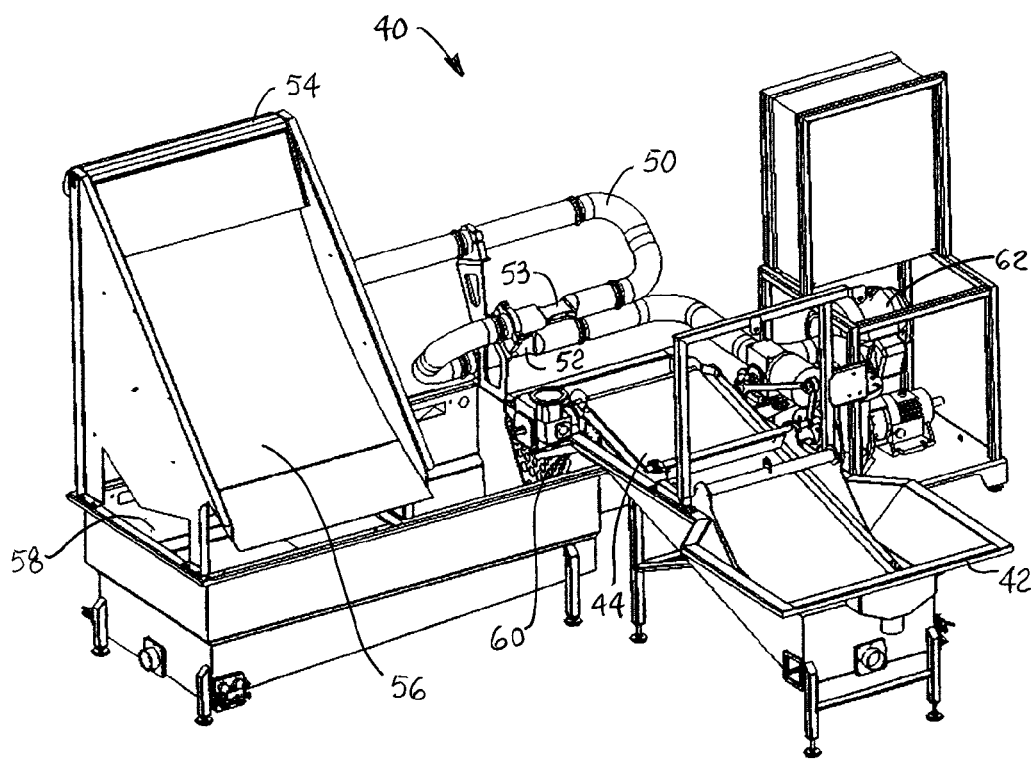
FIGS. 4A and 4B are front and rear isometric views of a deheading system including venturi tubes as in FIG. 2.
Figure 4B:
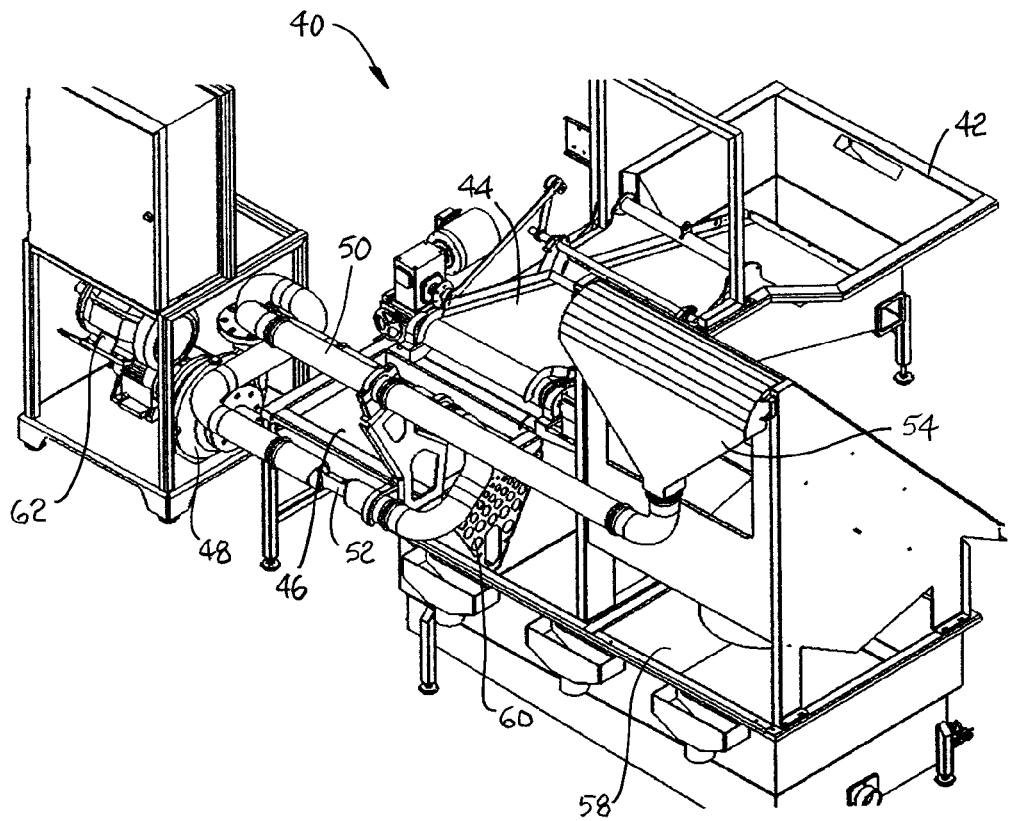

One version of a complete deheading system 40 is shown in FIGS. 4A and 4B. Shrimp are conveyed out of a feed tank 42 by a conveyor belt 44 and dropped into a fluid-filled trough 46. A food pump 48 draws shrimp-laden fluid from the trough 46 and pumps it into a conduit system 50, which has two venturis 52, 53 at spaced apart locations along its length. Shrimp are deheaded in the venturis and conveyed by the fluid through the conduit system to a feed plenum 54. The shrimp bodies and detached heads drop from the plenum onto a screen slide 56. The fluid drains through the screen and into a tank 58 in fluid communication with the trough 46. A perforated plate 60 between the tank and the trough prevents shrimp in the trough from entering the tank 58. The food pump 48 is driven by a pump motor 62. Together, the pump and the motor form flow control means that controls the flow rate and the fluid speed through the conduit system.

Figure 5:
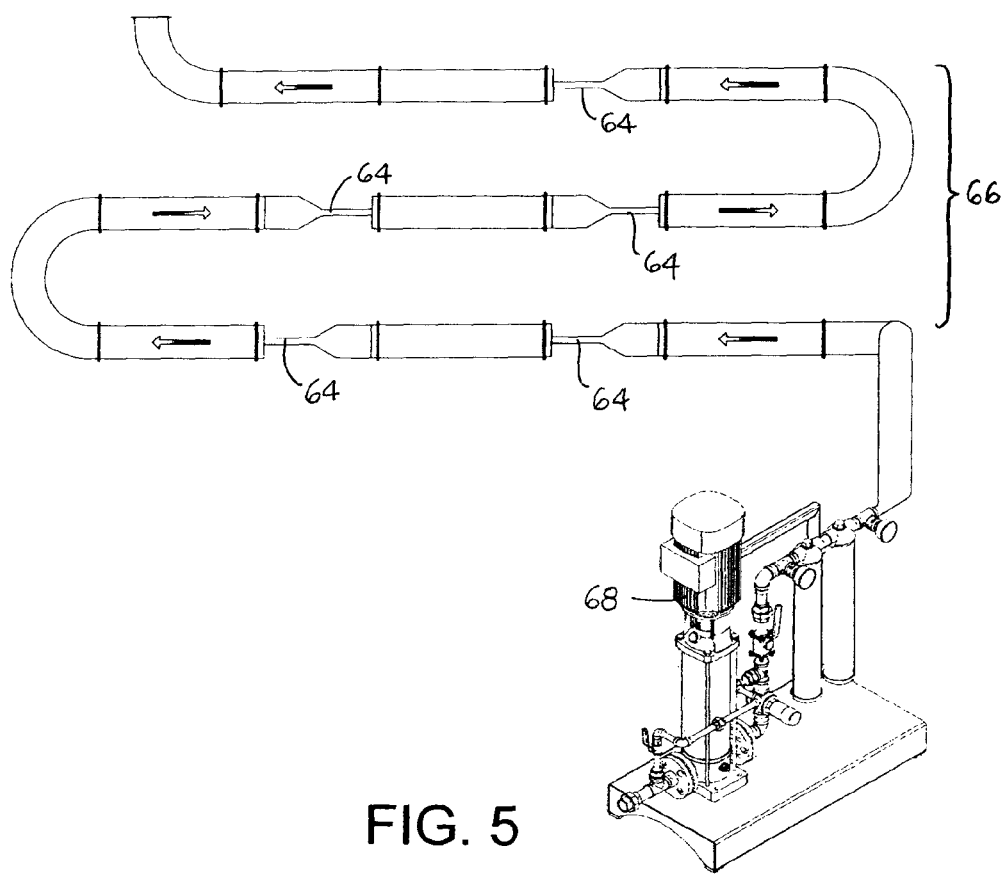
FIG. 5 is a schematic diagram of a multi-venturi deheading system using venturis as in FIG. 2.
Figure 6:
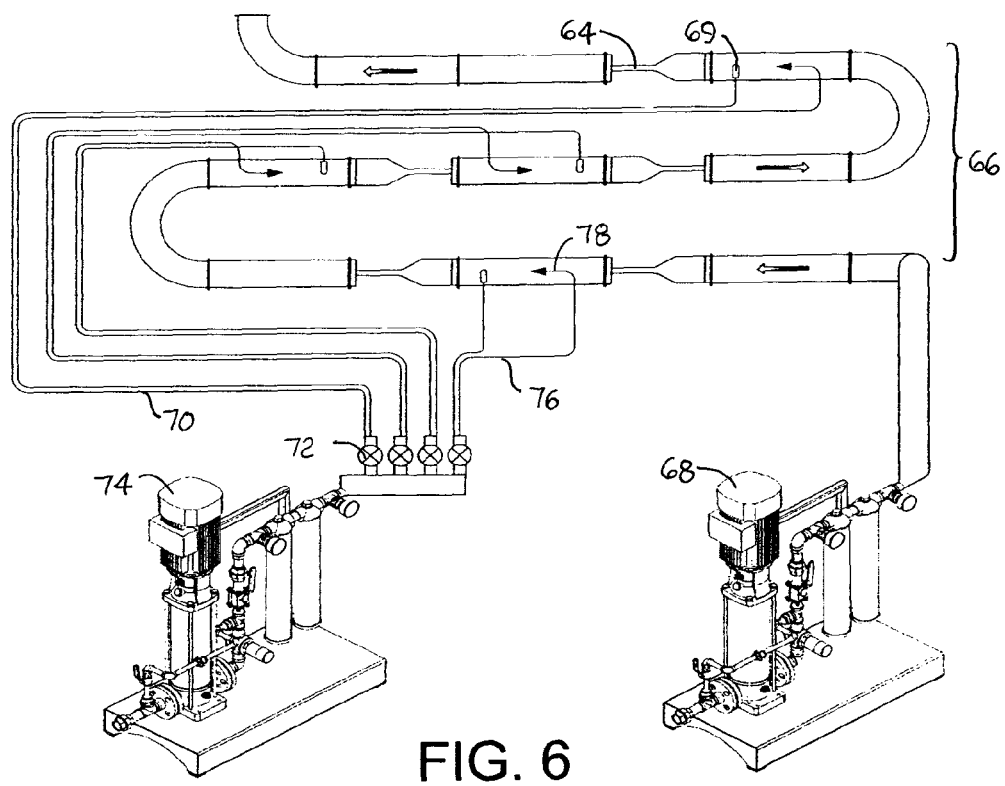
FIG. 6 is a schematic diagram of a multi-venturi deheading system as in FIG. 5 including an additional boost pump.

The deheading system shown in FIG. 5 has five venturis 64 connected in series in a conduit system 66. A food pump 68 induces a flow through the conduit system 66. Such a multiple-venturi system can be effective for deheading sturdy shrimp. The deheading system of FIG. 6 adds fluid-pressure sensor 69 at sensor locations in the conduit system 66, for example, at locations just upstream of the final four venturis 64 to measure the hydrodynamic force of the flow. The outputs 70 of the pressure sensors control valves 72 connected between a boost pump 74 and fluid lines 76 injecting fluid into the conduit system at injection locations 78 near the sensor locations, for example, to replace any leaked fluid and to maintain the fluid pressure along the length of the fluid channel.

Although the invention has been described in detail with respect to a few versions, other versions are possible. For example, if large-diameter conduit, such as ten-inch—diameter pipes instead of 4-inch—diameter pipes, the cross-sectional area of the venturis could be circular or square because the diameter of the circular opening or the lengths of the sides of the square opening would be large enough to allow shrimp through without damaging collisions with the walls of the conduit. As another example, a complete system using only a single venturi may be sufficient to detach heads from the shrimp in some situations. So, as these suggestions suggest, the claims are not meant to be limited to the details of the exemplary embodiments.

What is claimed is:

1. Apparatus for detaching heads from shrimp, comprising:
    a conduit enclosing a fluid channel and having:
        an open first end and an opposite open second end downstream of the first end along the fluid channel;
        an input portion extending downstream along the fluid channel from the first end and defining the fluid channel with a first cross-sectional area;
        a venturi extending upstream along the fluid channel from the second end and defining a length of the fluid channel with a second cross-sectional area smaller than the first cross-sectional area, wherein the second cross-sectional area has a major axis and a minor axis shorter than the major axis;
        a transition portion disposed between the input portion and the venturi and defining a length of the fluid channel with a cross-sectional area converging from the first cross-sectional area to the second cross-sectional area;
    flow control means inducing a flow of shrimp-laden fluid in the conduit through the open first end, the fluid channel, and the open second end;
    wherein the speed of the fluid along the length of the fluid channel in the transition portion increases to a speed in the venturi sufficient to detach heads from shrimp.

2. Apparatus as in claim 1 wherein the first cross-sectional area is circular.

3. Apparatus as in claim 1 wherein the second cross-sectional area is rectangular.

4. Apparatus as in claim 1 wherein the conduit further comprises an output portion downstream of the open second end and defining the fluid channel with a cross-sectional area equal to the first cross-sectional area.

5. Apparatus as in claim 4 wherein the conduit further comprises a second transition portion disposed between the venturi and the output portion and defining a length of the fluid channel with a cross-sectional area diverging from the second cross-sectional area to the first cross-sectional area.

6. Apparatus as in claim 1 wherein the flow control means includes a food pump.

7. Apparatus for detaching heads from shrimp, comprising:
    a conduit system defining a fluid channel;
    flow control means inducing a flow of shrimp-laden fluid in the fluid channel to convey the shrimp-laden fluid through the conduit system;
    a plurality of venturis disposed in the conduit system in line with the fluid channel at spaced-apart positions in the conduit system to cause an increase in the speed of the shrimp-laden fluid in the fluid channel in each of the venturis sufficient to detach heads from shrimp.

8. Apparatus as in claim 7 wherein the flow control means includes a food pump pumping shrimp-laden fluid into one end of the conduit system.

9. Apparatus as in claim 8 wherein the fluid control means further includes one or more pressure sensors at one or more sensor locations in the conduit system for measuring the fluid pressure and a boost pump pumping fluid into the conduit system at one or more injection locations in response to the measurements of fluid pressure by the one or more pressure sensors.

10. Apparatus as in claim 9 wherein the fluid control means further includes one or more valves between the boost pump and the conduit system for controlling the amount of fluid pumped into the conduit system at the one or more injection locations.

11. Apparatus as in claim 7 wherein the venturis each have a restricted interior cross-sectional shape having a major axis and a shorter minor axis defining the fluid channel through the venturi.

12. Apparatus as in claim 7 wherein the venturis each have a restricted interior rectangular cross-sectional shape defining the fluid channel through the venturi.

13. A method for detaching the heads of shrimp, comprising:
flowing a shrimp-laden fluid through a fluid channel in a conduit system;
restricting the fluid channel in venturis at spaced apart locations along the conduit system to increase the speed of the shrimp-laden fluid in each of the venturis sufficient to detach heads from shrimp.

14. The method of claim 13 further comprising injecting fluid into the conduit system at one or more injection locations along the fluid channel to boost the speed of the fluid.

15. The method of claim 13 further comprising measuring the fluid pressure at one or more sensor locations along the fluid channel.

* * * * *